May 14, 1968   E. A. KELLER   3,383,690
BEARING MEASUREMENT SYSTEM
Filed Feb. 21, 1967                    3 Sheets-Sheet 1
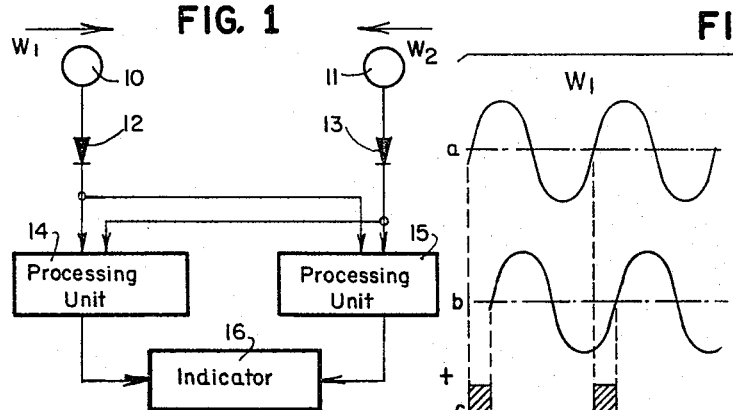
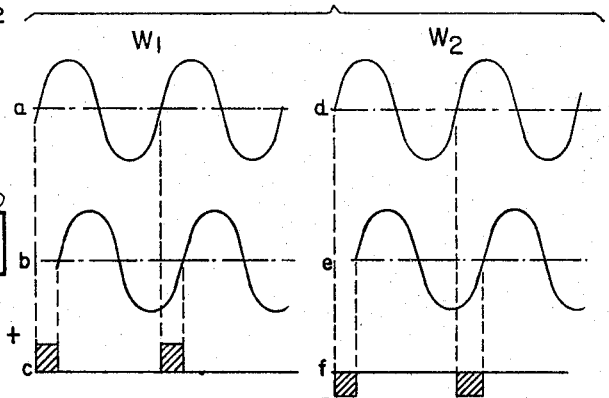
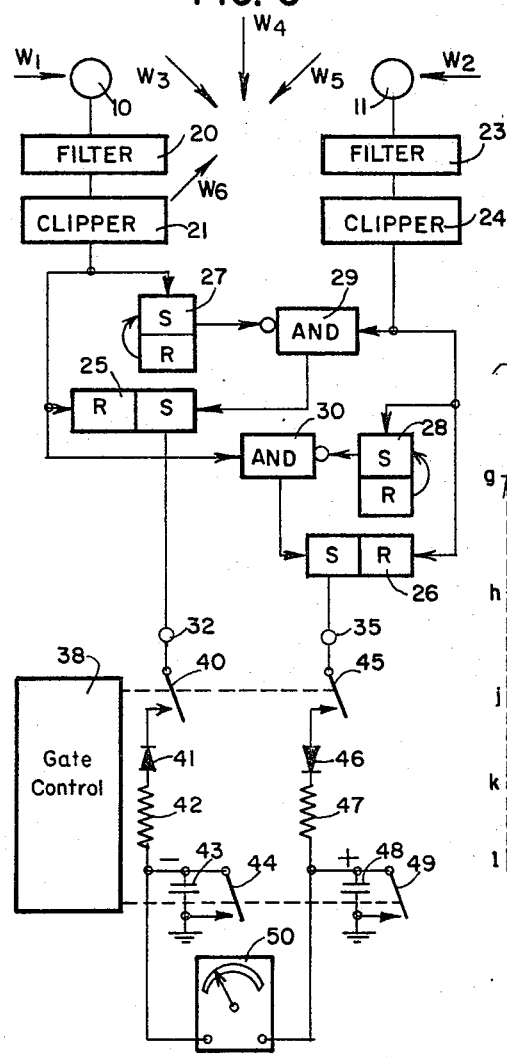
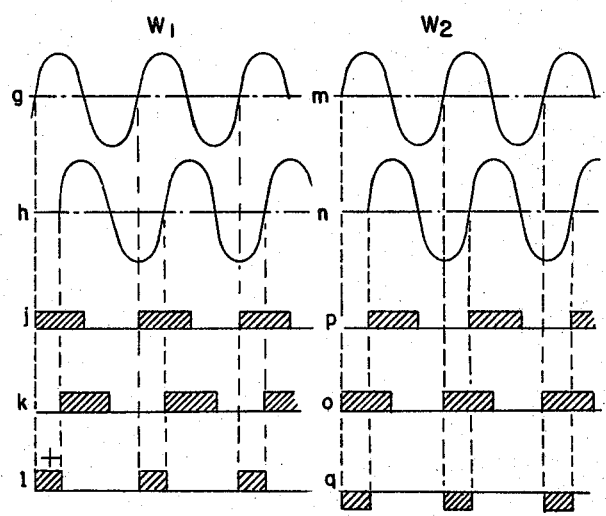
Inventor
Ernest A. Keller
By Mueller & Aichele
Attys.

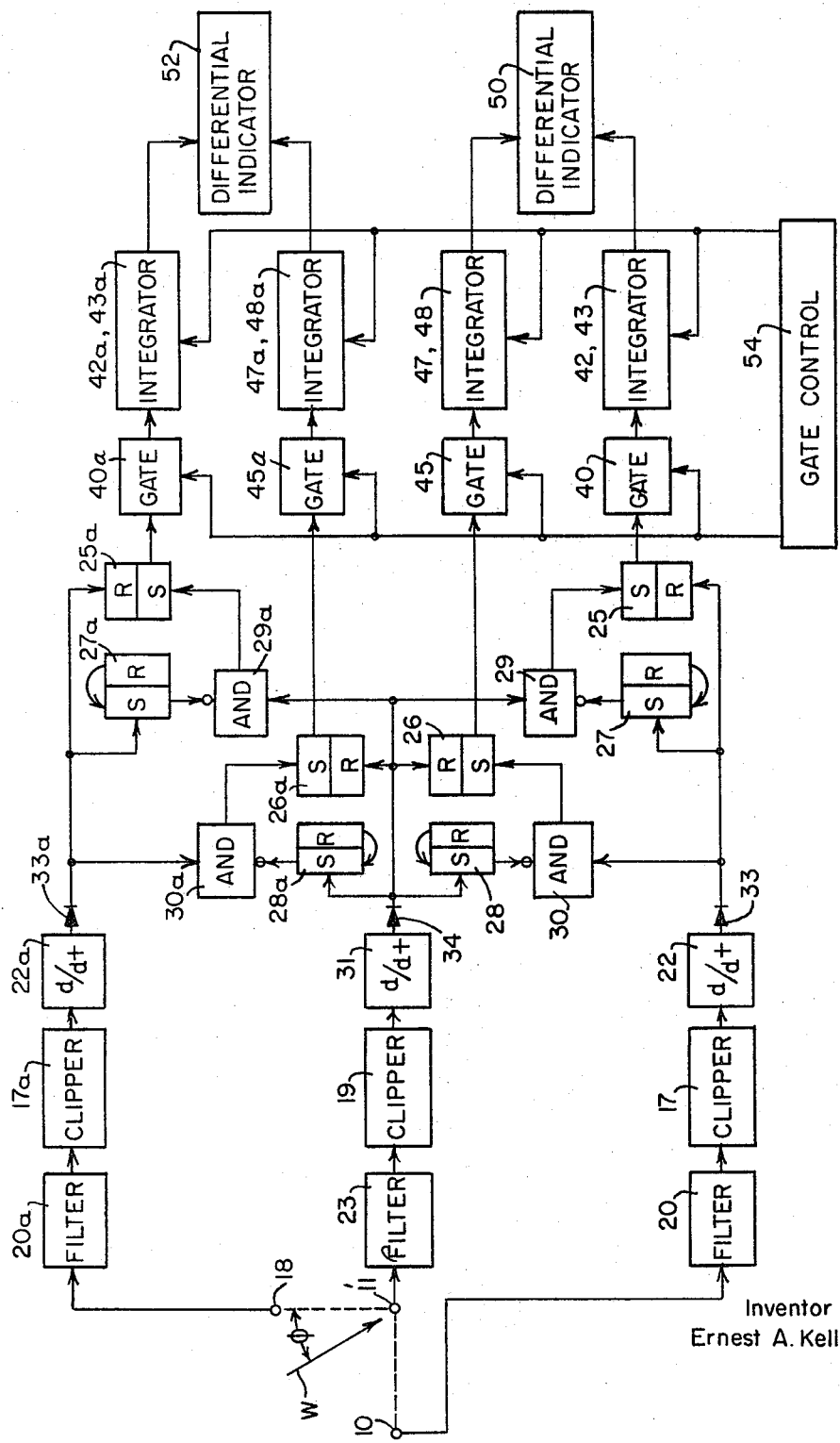

May 14, 1968     E. A. KELLER     3,383,690
BEARING MEASUREMENT SYSTEM
Filed Feb. 21, 1967     3 Sheets-Sheet 3
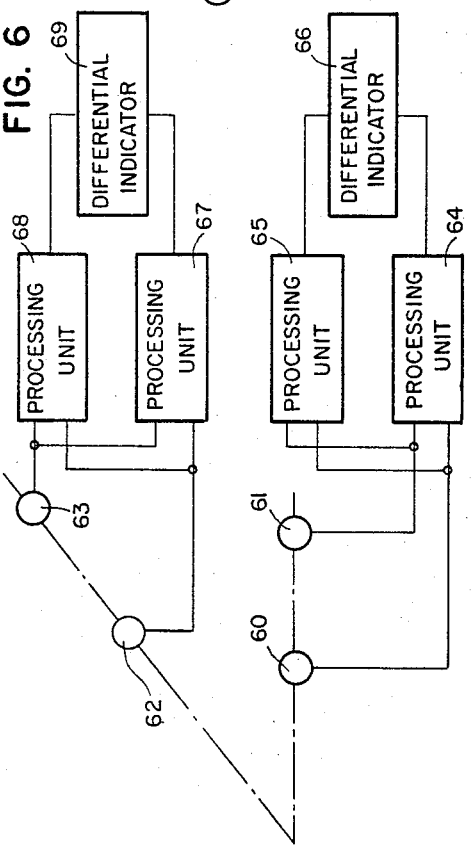
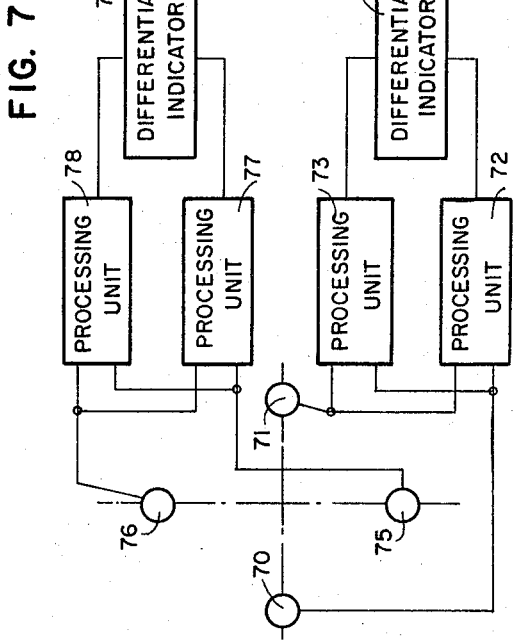
Inventor
Ernest A. Keller
By Mueller & Aichele
Attys.

United States Patent Office 3,383,690
Patented May 14, 1968

3,383,690
BEARING MEASUREMENT SYSTEM
Ernest A. Keller, Wilmette, Ill., assignor to Motorola, Inc., Franklin Park, Ill., a corporation of Illinois
Continuation-in-part of application Ser. No. 436,735, Mar. 3, 1965. This application Feb. 21, 1967, Ser. No. 633,641
15 Claims. (Cl. 343—113)

ABSTRACT OF THE DISCLOSURE

A bearing measurement system using a statistical signal processing technique for the determination of the bearing of a signal source. The time intervals for passage of a signal wave between a pair of transducers is measured and integrated over a time period to determine the direction from which the signal wave is coming.

CROSS REFERENCES

This application is a continuation-in-part of the application of Ernest A. Keller, Ser. No. 436,735, filed Mar. 3, 1965, now abandoned.

BACKGROUND OF THE INVENTION

It is desired in many instances to be able to determine the direction of a source of signals, when such signals are received together with noise which is random both as to frequency and direction. Various systems have been used for this purpose including systems operating on the phase summation principle, and systems using electrically steered antenna arrays and delay compensation techniques. These systems may use correlation techniques and have been found to work satisfactorily under conditions in which the characteristics of the signal are sufficiently well known. However, these systems do not operate properly when the signal is below the level of the noise and when the signal parameters are not well known. Further, such systems require large and cumbersome antenna or transducer arrays which are relatively expensive. Also, the signal processing equipment required is complex and costly.

SUMMARY

It is, therefore, an object of the present invention to provide an improved system for indicating the direction of a particular signal from a given direction in the presence of noise signals having a random distribution, and which may be stronger than the particular signal.

Another object of the invention is to provide a system for determining the direction from which a signal is received, which utilizes a statistical technique which is not critical as to the frequency, phase and amplitude relationships of the signal.

A further object of the invention is to provide a direction detecting system wherein the transducer elements are of small size and can be closely spaced to provide a compact unit.

A feature of the invention is the provision of a direction detecting system including at least first and second spaced transducers for receiving waves and converting the same to electrical signals, and apparatus for processing the signals to produce a first pulse wave representing the passing of signals from the first transducer to the second, and a second pulse wave representing the passage of signals from the second transducer to the first, and for interacting the first and second pulse waves to indicate signals from a given direction.

A further feature of the invention is the provision of a direction detecting system including a plurality of pairs of transducers spaced apart less than one-half the wave length of the highest frequency of the waves to be considered, with the pairs being aligned in different directions. Two pairs spaced at right angles can provide a nonambiguous indication in a plane, and three pairs spaced at mutual right angles can provide a nonambiguous three dimensional indication. A common transducer may be used for two or three directions.

Another feature of the invention is the provision of a system including spaced transducers for receiving waves, and processing apparatus responsive to zero crossings of the waves to produce pulses having durations representing the time delay between arrival of the waves at the transducers, with differential combining means indicating the direction of waves from a particular direction and integrating out the effect of waves from random directions. The processing apparatus may include trigger circuits having first and second branches, with the first branch actuated by positive-going zero crossings of the waves at one transducer and reset by positive-going zero crossings at the second transducer, and the second branch actuated by positive-going zero crossings of the wave at the second transducer and reset by positive-going zero crossings at the first transducer, with pulses from each branch being stored before the combining action to balance out signals from random directions.

Still another feature of the invention is the provision of a signal processing system for indicating the direction of waves received as spaced transducers, including a first bistable multivibrator circuit set by positive-going zero crossings of the wave at the first transducer through an AND gate which is inhibited by a monostable multivibrator circuit triggered by a positive-going zero crossing of the wave at the second transducer, a second bistable multivibrator circuit set by positive-going zero crossings of the wave at the second transducer through an AND gate which is inhibited by a monostable multivibrator circuit triggered by a positive-going zero crossing of the wave at the first transducer. The outputs from the set stages are applied to an integrating circuit for a predetermined time interval and the resulting voltages combined to give an indication of the direction of a wave with respect to the two transducers. The waves from the transducers are applied to the bistable and monostable circuits through filters and clippers to facilitate triggering at the zero crossings of the waves.

The invention is illustrated in the drawings wherein:

FIG. 1 illustrates a simplified form of the direction detecting system of the invention;

FIG. 2 is a set of curves illustrating the operation of the system of FIG. 1;

FIG. 3 is a circuit diagram showing the processing circuits for a one dimensional system;

FIG. 4 is a set of curves illustrating the operation of the system of FIG. 3;

FIG. 5 is a circuit diagram illustrating a two dimensional system; and

FIGS. 6, 7, 8 and 9 illustrate various transducer arrangements for two and three dimensional systems.

DESCRIPTION

The system of the invention can be used for determining the direction of a wave having finite energy content and coming from a given direction during a given time interval in the presence of random signals which are stronger than the wave of interest. The system can be used for waves of audio frequency or radio frequency, transmitted through the air or through water. The waves are picked up by transducers or sensors which are spaced by an amount less than one half a wave length at the highest frequency to be received. The transducer or sensor can be a microphone in a system operating in air at audio frequencies, a hydrophone in a system operating in the water, or a dipole antenna in a system operating at radio frequencies. Signals from two spaced transducers are applied to processing apparatus which senses the zero crossings of the waves. One processing unit produces a pulse when a wave reaches one transducer before it reaches the other, with the duration of the pulse indicating the time difference in arrival of the wave at the two transducers. The second processing unit responds to the difference in arrival time at the transducers of a wave from the opposite direction. The outputs of the two units are combined so that when the outputs are the same, which occurs during random signals, there is no output. However, when a wave is received from a given direction, the output of one unit is greater than that of the other so that an indication is produced. This indicates the component of a particular wave which is along one axis. By using two systems responding to waves at right angles, an unambiguous indication of the direction in a plane can be provided. The addition of a system operating in a third direction provides a three dimensional indication.

Although the system is not critical as to frequency, the waves processed must have a wave length at least twice the spacing of the sensors. Low pass filters may be used to limit the signals applied from the transducers to the processing equipment. It may be preferable to use a bandpass filter to remove low frequency components which are not of interest. The filtered signals may be clipped to provide waves having more sharply defined zero crossings. The clipped pulses from the spaced transducers are differentiated and rectified to produce trigger pulses at the time of the zero crossings. The trigger pulses are applied to two bistable circuits, each being selectively controlled by trigger pulses developed from the signals at the two transducers. The trigger pulses from one transducer are applied to one bistable circuit through an AND gate, which is inhibited by a monostable circuit triggered by the trigger pulses from the other transducer. Accordingly, this bistable circuit is set only when there is a signal at the one transducer and not at the other transducer. The trigger pulses from the second transducer are applied in a corresponding way to the second bistable circuit. The bistable circuits are connected so that one provides an output representing the time difference in arrival at the two transducers by waves from one direction, and the second provides an output representing the time difference in arrival at the two transducers of waves from the opposite direction. The pulses from the two outputs are integrated to produce two voltages which are compared to indicate the direction of a particular wave. Gating circuits are used to control the time interval of integration to a finite time.

The system can be used for indicating the direction of signals from various sources not directly related to the receiving equipment. The system can also be used in combination with transmitting equipment to receive transmitted waves which have been reflected from objects, to thereby indicate the position of the object from the direction of the received reflected signal.

Referring now to the drawings, in FIG. 1 there is shown a system including sensors 10 and 11. As previously stated, these may be units of various types depending upon the type of wave, the direction of which is to be determined. Waves from transducer 10 are provided through rectifier 12 to the two processing units 14 and 15. Transducer 11 is spaced from transducer 10 by a distance less than one-half wave length at the highest frequency to be received. The waves from transducer 11 are applied through rectifier 13 to the processing units 14 and 15. The output from the processing units 14 and 15 are applied to a combining device indicated as 16.

The operation of the system of FIG. 1 will be explained in connection with waves as illustrated in FIG. 2. Considering wave $W_1$ which is passing in the direction from sensor 10 to sensor 11, curve $a$ in FIG. 2 shows the arrival of the wave at sensor 10. The wave will arrive at sensor 11 at a later time as shown by curve $b$. The processing unit 14 recognizes that activation of sensor 10 preceded the activation of sensor 11. This "10 before 11" response produces in the processing circuitry a wave of positive pulses as shown by curve $c$. Each pulse starts when the wave $W_1$ at transducer 10 has a positive-going zero crossing and terminates when the wave at transducer 11 has a positive-going zero crossing. The duration of this pulse, therefore, indicates the length of time required for the same point on wave $W_1$ to pass from transducer 10 to transducer 11.

The wave $W_2$ represents a wave passing in the direction from transducer 11 to transducer 10. Line $d$ of FIG. 2 shows the wave $W_2$ as it arrives at transducer 11. The unit 15 will be actuated by the positive-going crossings of the wave at transducer 11 and cut off by the positive-going crossing of the wave at transducer 10 (curve $e$). In this case, the sensor 11 is activated before sensor 10. The processing unit 15 produces for this case of "11 before 10" a negative-going waveform (curve $f$).

It will be apparent that when the waves $W_1$ and $W_2$ come from exactly opposite directions, the pulse outputs of processing units 14 and 15 will be exactly the same but with opposite polarities. These pulse outputs are combined by indicator 16 so that there is no output. However, if the wave $W_1$ is a signal from the direction shown and there is no corresponding wave from the opposite direction, the output of unit 14 would be applied alone to the indicator 16. Accordingly, the device 16 will give an indication of the wave $W_1$ (positive). Similarly, only the unit 15 will produce an output if the wave $W_2$ is received alone and there is no corresponding output from the unit 14. The indicator 16 can obviously indicate which of the units 14 or 15 produces the greater output to thereby give an indication of the direction of the signal.

FIG. 3 shows more specifically the processing arrangement which can be used in a system as illustrated in FIG. 1. The transducers 10 and 11 are spaced by a distance less than $L/2$, where L is the wave length at the highest frequency to be utilized. The signal from transducer 10 is applied through a filter 20 to a clipper 21. The filter 20 must have an upper cutoff frequency less than $C/L$ where C is the velocity of wave propagation. The filter 20 may be a low pass filter, but a bandpass filter may be preferable in some applications so that noise at low frequencies, which are not to be considered, will be rejected. If a signal is to be detected in an environment where noise is not of consequence, a filter is not required, as long as the $C/L$ frequency limit is not surpassed. The output of the filter 20 is applied to clipper 21. The purpose of the clipper is to provide a wave with sharp zero crossings. Clipper 21 also differentiates the wave and clips the signals of one polarity to provide trigger pulses therefrom at one of the zero crossings of the wave, in this example the positive-going zero crossing.

The signals from transducer 11 are applied to filter 23 and clipper 24, which may be identical to filter 20 and clipper 21. The trigger pulses at the output of the clippers 21 and 24 are applied to a processing circuit including bistable multivibrator circuits 25 and 26, monostable multivibrator circuits 27 and 28, and AND gates 29 and 30. The positive trigger pulse from clipper 21 is applied directly to the reset stage of bistable circuit 25, and the positive trigger pulse from clipper 24 is applied through AND gate 29 to the set stage of bistable circuit 25. The positive trigger pulse from clipper 21 is applied to monostable circuit 27 to trigger the same for a given time period. This period may be slightly more than one-half the period of the highest frequency wave to be received. The monostable circuit 27 provides an inhibit signal to the AND gate 29 thus preventing any positive trigger pulse from clipper 24 reaching bistable circuit 25 during the activation time of monostable circuit 27.

The operation of the circuit of FIG. 3 will be described in connection with the waves $W_1$ and $W_2$ which approach the transducers from opposite directions, the waveforms of which are shown in FIG. 4. Wave $W_1$ reaches transducer 10 before it reaches transducer 11, with curve $g$ in FIG. 4 showing the wave $W_1$ at transducer 10, and curve $h$ showing the wave $W_1$ at transducer 11. Wave $W_1$ produces a signal at transducer 10 and the resulting trigger pulse at the output of clipper 21 triggers the monostable circuit 27 to inhibit AND gate 29. The monostable circuit is triggered for a period equal to one-half the wave length of the wave $W_1$ as is shown by the pulse wave $j$. Accordingly, the signal from transducer 11, and the trigger pulse produced therefrom by clipper 24, cannot be applied to set the bistable circuit 25, because AND gate 29 is inhibited. Therefore, bistable circuit 25 cannot be set and does not produce an output at 32.

The trigger pulse at the output of clipper 21, produced by the wave $W_1$ at transducer 10, is also applied through AND gate 30 to bistable circuit 26. As AND gate 30 is not inhibited, the trigger pulse passes through to set bistable circuit 26 so that an output appears at terminal 35. The output trigger pulse from clipper 24 from wave $W_1$ applied to transducer 11 is also applied to monostable circuit 28, and inhibits AND gate 30 for a time shown on curve $k$. However, since wave $W_1$ is delayed in reaching transducer 11, at the time the AND gate 30 is inhibited, the bistable circuit 26 is already set and a pulse output is produced at terminal 35. When the monostable circuit 28 is triggered from the wave applied to transducer 11 (curve $k$), the bistable circuit 26 will be reset, and the pulse output at terminal 35 will terminate to produce the pulse wave shown on line $l$ of FIG. 4.

Considering now the action produced by the wave $W_2$, which is from the opposite direction to wave $W_1$, wave $W_2$ will reach transducer 11 first as shown by curves $m$ and $n$ in FIG. 4. The wave transducer 11 will produce a trigger pulse from clipper 24 which triggers monostable 28 and inhibits gate 30 for the period of the monostable circuit, as shown by line $o$. Accordingly, there will be no output from bistable circuit 26 during this period. The trigger pulse from clipper 24, however, will be applied through AND gate 29 to set the bistable circuit 25 to produce an output at terminal 32. This is because the wave has not yet reached transducer 10 to trigger monostable circuit 27 and inhibit AND gate 29. When the wave $W_2$ reaches transducer 10, the trigger pulse from clipper 21 will trigger monostable circuit 27 and inhibit AND gate 29 to reset the bistable circuit 25. The pulse applied to monostable circuit 27 is shown by line $p$, and the pulse output of bistable circuit 25 is shown by line $q$. In the circuit of FIG. 3, it is the action of the AND gates and the monostable circuits which provides the distinctive response when a wave reaches one transducer before it reaches the other. This provides the same pulse outputs as described in connection with FIGS. 1 and 2.

The pulse output at terminal 32 is applied through switch 40 and diode 41 to the integration circuit including resistor 42 and capacitor 43. When switch 40 is closed, a negative voltage will build up on capacitor 43 having a value depending on the length of the pulse at terminal 32. The switch 44 is provided to short capacitor 43 so that it is discharged prior to the integration action.

The output at terminal 35 is similarly applied through switch 45 and diode 46 to the integrating circuit including resistor 47 and capacitor 48. Switch 49 can be closed to discharge capacitor 48. The switches 40, 44, 45 and 49 can be controlled by a gate control 38 with switches 44 and 49 being closed prior to the start of the integration period so that the capacitors are discharged. The switches 44 and 49 are then opened, and the switches 40 and 45 are closed, so that pulses from output terminals 32 and 35 are integrated over a period of time to provide a negative voltage across the capacitor 43, and a positive voltage across the capacitor 48. These voltages are applied to differential indicator 50 which will indicate the polarity and relative durations of the pulses produced at terminals 32 and 35. Although voltages of opposite polarities may be applied to the differential indicator as stated, a differential indicator may be used which responds to the difference between voltages of the same polarity.

As previously stated, if waves are received from opposite directions during the observation period, the pulses at terminals 32 and 35 will have the same duration and opposite polarity, and the indicator 50 will give a zero indication. If there is a wave only in the direction of wave $W_1$, and no wave in the opposite direction, there will be a pulse output only at terminal 35. In such case, a positive voltage will be developed across capacitor 48, but no voltage will be developed across capacitor 43. The indicator 50 will therefore show that a signal is received from the direction of wave $W_1$. The differential indicator 50 will give an opposite indication if a wave is received only in the direction of $W_2$.

FIG. 3 also includes arrows marked $W_3$, $W_4$, $W_5$ and $W_6$ representing waves which are received from directions other than the directions along the line between the two transducers 10 and 11. The wave $W_4$ is at right angles to the waves $W_1$ and $W_2$, and will have no components in either the direction of wave $W_1$ or wave $W_2$, so that no outputs will be produced on differential indicator 50. The waves $W_3$ and $W_6$ will have components in the direction of wave $W_1$ to produce an output at terminal 35. Wave $W_5$ will have a component in the direction of $W_2$ to produce an output at terminal 32. It will be apparent that with respect to waves coming at an angle to the line between the transducers, the differences in the time that a wave reaches the transducers 10 and 11 will be less than the difference in times for a wave along this line. This will produce pulses of shorter duration. The duration of the pulses will be represented by the voltage across the integrating circuits during a fixed timer interval so that these voltages will give an indication of the direction of the pulses.

As previously stated, the monostable multivibrator circuits 27 and 28 will normally have a period essentially of one-half the period of the highest frequency to be received. However, if it is desired to limit the directions of search, the period of the monstable multivibrator circuits can be reduced. For example, if the angle of a signal is roughly known, and there is substantial noise in other directions, some of the noise can be eliminated by restricting the period of the monostable circuits to accept only signals in the region of the signal to be considered.

Waves $W_3$ and $W_6$ of FIG. 3 have the same components in the direction of wave $W_1$ so that the system as described will not distinguish between the directions of these waves. To provide a system which will give an unambiguous indication of the direction of waves in a plane, two systems as shown in FIG. 3 may be used at right angles to each other. Such a system is shown in FIG. 5. The transducers 10 and 11 in FIG. 5, and the processing circuit coupled thereto, are the same as shown in FIG. 3. Transducer 18 is positioned with respect to transducer 11 so that the line therebetween is at a right angle to the line between transducers 10 and 11.

In FIG. 5, the components forming the processing circuit connected to transducers 10 and 11 are given the same numbers as in FIG. 3. The components of the processing circuit connected to the transducers 18 and 11 are given corresponding numbers followed by an $a$. The gates 40 and 45 as well as the gates 40$a$ and 45$a$ are operated by the gate control 54. These gates may be switches which apply the signals to the integrators for the observation period. The gate control 54 is also coupled to the integrators to discharge the capacitors thereof to prepare the integrators for the observation interval.

Clipper 21 of FIG. 3, which provides a wave with sharp zero crossings and differentiates this wave and further clips the differentiated wave to develop a trigger pulse at the time of the positive-going zero crossings, is represented by clipper 17, differentiator 22 and diode 33 in FIG. 5. Clipper 17 provides a square wave with sharp zero crossings. Differentiator 22 differentiates the square wave to provide trigger pulses at the positive-going and negative-going zero crossings of the square wave. Diode 33 clips the negative trigger pulses and applies the positive trigger pulses to AND gate 30, monostable circuit 27 and bistable circuit 25. Clipper 17a, differentiator 22a, diode 33a, clipper 19, differentiator 31 and diode 34 operate in the same manner to produce trigger pulses.

Considering a wave W at an angle with respect to the transducers 10 and 11, and also at an angle with respect to transducers 11 and 18, as shown in FIG. 5, the differential indicator 50 responsive to transducers 10 and 11 will produce an output proportional to the sine of the angle $\theta$ of the wave with respect to the line between transducers 11 and 18. The indicator 52 responsive to the waves from transducers 11 and 18 will produce an output responsive to the cosine of the angle $\theta$. These two outputs will completely define the direction of the wave W in a plane in an unambiguous manner.

It will be obvious that in the system of FIG. 5 components of random waves parallel to the direction of the line between transducers 10 and 11 will be balanced out in the indicator 50, and the right angle components parallel to the line between transducers 11 and 18 will be balanced out in the indicator 52. Accordingly, random signals will be balanced out and the indications will be only of signals from a given direction which is present for a sufficient time that the integration circuits will provide unbalanced voltages.

FIG. 6 shows another arrangement of transducers in a two dimensional unambiguous array. The transducers 60 and 61 are along a first line, and the transducers 62 and 63 are along a line at an angle with respect to the first line. This angle may be any angle other than zero or 180°. The signals from the two pairs of transducers can be processed in the manner previously described. Transducers 60 and 61 apply waves to processing units 64 and 65 to produce a first output in the differential indicator 66. The waves from transducers 62 and 63 are similarly processed in units 67 and 68 to provide an output in differential indicator 69. The two outputs 66 and 69 will not have a right angle relation as in FIG. 5, but a relation depending upon the angle between the two lines on which the transducers are positioned. A directional indication is obtained from the two indicators 66 and 69.

FIG. 7 shows a further arrangement wherein the lines on which the transducers are positioned are at right angles as in FIG. 5, but separate transducers are used for the two groups and there is a common center for the two groups. Transducers 70 and 71 form one pair which apply signals to the processing units 72 and 73. The combined signal is shown by differential indicator 74. Transducers 75 and 76 apply signals to processing units 77 and 78. The outputs of these two processing units are combined by indicator 79. The outputs of indicators 74 and 79 form right angle components as is the case of the indicators in FIG. 5.

FIG. 8 shows a three dimensional arrangement which includes the system of FIG. 5. Transducers 10, 11 and 18 may be coupled to a processing system as shown in FIG. 5. The transducers 80 and 81 are on a line at a right angle to the plane of transducers 10, 11 and 18. These transducers apply signals to processing units 82 and 83, and the outputs from the processing units are applied to the differential indicator 84. Indicator 84 produces an output which will indicate the component of the wave at right angles to the components indicated by the indicators 50 and 52 to thereby provide a three dimensional indication.

FIG. 9 shows a still different two dimensional array which is arranged to reduce tilt error. The transducers 90, 91 and 92 are connected in a system as shown by FIG. 5. Transducers 93, 91 and 94 are connected to a second system as shown in FIG. 5. The indicators of the two systems can be coupled to a computer which uses one system to correct the indication of the other system. By use of the two systems to compensate each other tilt error can be greatly reduced.

The invention therefore provides a system for determining the direction of a signal by use of a statistical technique. The system is not critical of the frequency or amplitude of the signal to be considered. Also, the array of sensors of transducers required can be compact, and the processing equipment can be of the digital type which is particularly suitable for construction in integrated form. Accordingly, the overall equipment can be small and relatively inexpensive.

I claim:

1. A system for determining the direction of a particular wave received from a predetermined direction in the presence of random waves received from random directions, such system including in combination, first and second transducers spaced less than half the wave length of the maximum frequency of the wave to be processed for receiving the waves and converting the same to electrical signals, processing means coupled to said transducers for producing a first pulse wave representing the passage of waves from said first transducer to said second transducer and a second pulse wave representing the passage of waves from said second transducer to said first transducer, and indicator means coupled to said processing means and responsive to said first and second pulse waves for producing an indication of the direction of the particular wave.

2. The system according to claim 1 wherein, bandpass filter means couples said first and second transducers to said processing means for determining the direction of a particular wave within the frequency band of said bandpass filter means, and wherein said indicator means is differentially responsive to said first and second pulse waves for producing an indication of the direction of the particular wave.

3. The system according to claim 1 wherein, said processing means includes first and second processing circuits each having first and second portions, first and second circuit means coupling said first and second processing circuits being connected to said first and second transducers respectively and being set by the zero crossings of a particular direction of said first and second alternating current signals respectively, said first and second portions being reset by said zero crossings of said particular direction of said second and first alternating current signals respectively, said processing circuits providing said first and second pulse waves in response to said first and second alternating current signals, and said processing circuits being coupled to said indicator means for applying said first and second pulse waves thereto.

4. The system of claim 3 wherein said first and second circuit means each includes filter means, clipper means, differentiating means and gate means, said gate means of said first circuit means being coupled to said second circuit means and inhibited by said zero crossings of said particular direction of said second alternating current signal, said gate means of said second circuit means being coupled to said first circuit means and inhibited by said zero crossings of said particular direction of said first alternating current signal.

5. A system for determining the direction of particular waves received from predetermined directions and which are within a given frequency band, in the presence of random waves of various frequencies received from various directions, such system including in combination, first and second transducers for receiving the waves and converting the same to electrical signals, said transducers being spaced from each other by a distance less than half a wave length at the highest frequency in the given frequency band, processing means coupled to said transducers for producing a first pulse wave including pulses having durations corresponding to the delay in time of arrival of a particular point on a wave at said first transducer after arrival thereof at said second transducer and a second pulse wave including pulses having durations corresponding to the delay in time of arrival of a point on a wave at said second transducer after arrival thereof at said first transducer, first and second integrating means coupled to said processing means for individually integrating said first and second pulse waves to produce first and second voltages respectively, and means differentially responsive to said first and second voltages for producing an indication of the direction of a particular wave coupled to said first and second integrating means.

6. The system according to claim 5 and further including, gate means connected to said first and second integrator means and coupling said processing means thereto, said gate means conditioning said integrator means for initial operation and applying said pulse waves thereto over a given time period to produce said first and second voltages.

7. The system according to claim 5 and further including, filter means coupled to said transducers for excluding signals above a given frequency, and clipper means coupling said filter means to said processing means for converting the electrical signals to first and second trigger pulses, said processing means being responsive to said first and second trigger pulses to develop said first and second pulse waves.

8. The system according to claim 7 wherein, said clipper means includes first and second clipper circuits coupled to said first and second filter means respectively for converting said electrical signals to square waves, first and second differentiating means coupled to said first and second clipper circuits respectively and third and fourth clipper circuits coupled to said first and second differentiating means respectively, said differentiating means and said third and fourth clipper circuits being responsive to said square waves to develop said first and second trigger pulses, said processing means including first and second processing circuits each having first and second portions, first circuit means connecting said third clipper circuit to said first portion of said first processing circuit for setting the same in response to said first trigger pulse, second circuit means connecting said fourth clipper circuit to said first portion of said second processing circuit for setting the same in response to said second trigger signal, said first and second circuit means including first and second gate means and first and second trigger means coupled thereto respectively, said first trigger means being coupled to said second circuit means and actuated by said second trigger pulse to inhibit said first gate means and prevent the setting of said first processing circuit, said second trigger means being coupled to said first circuit means and actuated by said first trigger pulse to inhibit said second gate means and prevent the setting of said second processing circuit, said first and second processing circuits acting in response to said first and second trigger pulses to produce said pulse waves.

9. The system according to claim 8 wherein, said first and second differentiating means and said third and fourth clipper circuits are responsive to positive-going zero crossings of said square wave to develop said first and second trigger signals, said first and second processing circuits include first and second bistable circuits respectively each having first and second portions, said first gate means connecting said third clipper circuit to said first portion of said first bistable circuit for setting said first bistable circuit in response to said first trigger pulse, said second gate means connecting said fourth clipper circuit to said first portion of said second bistable circuit for setting said second bistable circuit in response to said second trigger pulse, said first and second trigger means including first and second monostable circuits respectively each adapted to be triggered for a predetermined time, said first monostable circuit being coupled to said first gate means and to said fourth clipper circuit and actuated by said second trigger pulse to inhibit said first gate means, said second monostable circuit being coupled to said second gate means and to said third clipper and actuated by said first trigger pulse to inhibit said second gate means, said first and second bistable circuits producing said pulse waves at said first portion thereof, and further gate means applying said pulse waves to said first and second integrating means respectively for a predetermined time period.

10. A system for determining the direction of arrival of a particular wave within a given frequency band and received from a predetermined direction in the presence of random waves of various frequencies received from various directions, such system including in combination a plurality of pairs of transducers for receiving the waves and converting the same to electrical signals, said transducers of each pair being positioned along a line, with the lines of the different pairs being arranged at angles with respect to each other, said transducers of each pair being spaced from each other by a distance less than half a wave length at the highest frequency in the given frequency band, processing means coupled to said transducers of each pair for producing first pulse waves representing the time delay in the passing of waves from one of said transducers of each pair to the other of said transducers of the same pair and second pulse waves representing the time delay in the passing of waves from said other transducer of each pair to said one transducer of the same pair, and indicator means coupled to said processing means and responsive to said first and second pulse waves produced by each pair of transducers for producing an indication of the direction of the particular wave.

11. The system according to claim 10 wherein said plurality of pairs of transducers consists of a first pair of transducers and a second pair of transducers.

12. The system according to claim 11 wherein said first and second pairs of transducers include a transducer common to each pair.

13. The system according to claim 12 wherein said angle between said lines is a right angle.

14. The system according to claim 10 wherein; said processing means includes first and second filters coupled to separate ones of said transducers of each pair for excluding signals outside of said given frequency band, first and second clippers coupled to said first and second filters respectively for producing waves of square waveform, first and second differentiators coupled to said first and second clippers respectively for producing trigger pulses at the zero crossings of said electrical signals, first and second bistable circuits each having first and second portions, circuit means coupling said first and second differentiators to said first and second portions respectively of said first bistable circuit and to said second and first portions respectively of said second bistable circuit for actuating said first and second bistable circuits by said trigger pulses at the zero crossings of a particular direction of said alternating current signals, said first and second bistable circuits producing said first and second pulse waves respectively in response to said actuation, and first and second integrator means for producing voltages representing the duration of said pulse waves applied thereto coupling said first and second bistable circuits to said indicator means.

15. The system according to claim 14 wherein, said circuit means further includes first gate means connecting said first differentiator to said first portion of said first bistable circuit for actuating said first portion thereof by zero crossings of said particular direction of said first alternating current signal, second gate means connecting said second differentiator to said first portion of said second bistable circuit for actuating said first portion thereof by zero crossings of said particular direction of said second alternating current signal, first and second monostable circuits each adapted to be triggered for a given period, said first monostable circuit being coupled to said first gate means and to said second differentiator and actuated by said zero crossings of said particular direction of said second alternating current signal to inhibit said first gate means, said second monostable circuit being coupled to said second gate means and to said first differentiator and actuated by said zero crossings of said particular direction of said first alternating current signal to inhibit said second gate means, and further gate means applying said pulse waves from said first and second bistable circuits to said first and second integrating means respectively for a predetermined time period.

References Cited

UNITED STATES PATENTS 3,325,813  6/1967  Quick et al. -------- 343—113
3,339,204  8/1967  Rail -------------- 343—113

RODNEY D. BENNETT, *Primary Examiner.*

R. E. BERGER, *Assistant Examiner.*